June 12, 1934.         D. E. TRUCKSESS         1,962,333
SPEED REGULATOR SYSTEM
Filed Nov. 25, 1932
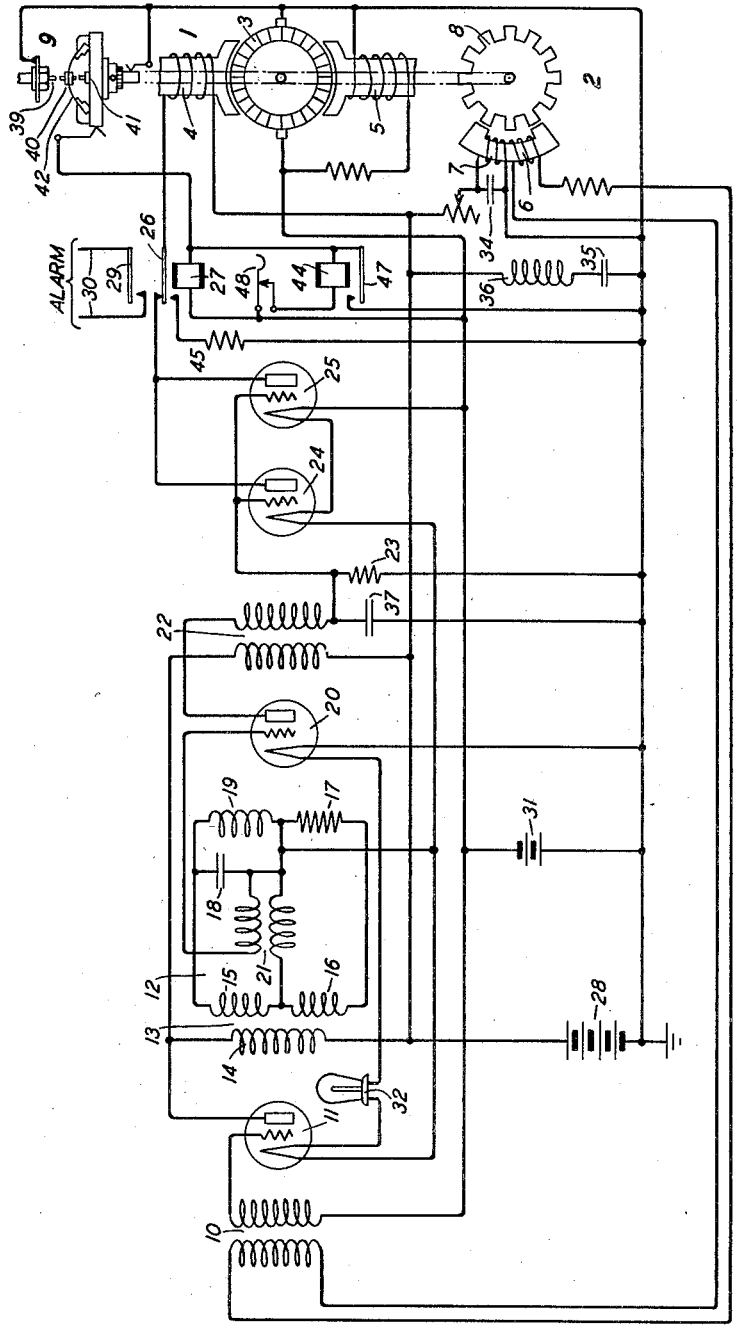
INVENTOR
*D.E. TRUCKSESS*
BY
*Wayne B Wells*
ATTORNEY Patented June 12, 1934

1,962,333

UNITED STATES PATENT OFFICE 1,962,333

SPEED REGULATOR SYSTEM

David E. Trucksess, New York, N. Y., assignor to Bell Telephone Laboratories, Incorporated, New York, N. Y., a corporation of New York Application November 25, 1932, Serial No. 644,223

7 Claims. (Cl. 171—312)

This invention relates to speed regulator systems for dynamo-electric machines and particularly to speed regulator systems provided with emergency control of the dynamo-electric machines in case of abnormal speed conditions.

One object of the invention is to provide a control system for a dynamo-electric machine that shall normally control the field excitation of the machine to maintain the speed substantially constant and that shall energize the machine field winding at a constant rate in case of abnormal machine speed conditions.

Another object of the invention is to provide a control system for a motor that shall normally control a field winding of the motor to maintain the motor speed substantially constant and in case of abnormal motor speed conditions that shall operate an alarm and insure the energization of the field winding at a constant rate.

A further object of the invention is to provide a motor control system that shall control the excitation of a regulating field winding for a motor in accordance with the motor speed to maintain the motor speed substantially constant and that shall operate an alarm and energize the regulating field winding at a constant rate in case the motor operates above a predetermined upper speed limit or below a predetermined lower speed limit.

In many cases it is desirable to maintain the speed of a motor substantially constant with very close precision. A precision regulator system is generally employed to control the field excitation of a motor when it is desired to operate the motor at constant speed with very close precision. However, in case of failure of some part of a precision regulator system the field excitation of the motor may be so varied as to operate the motor at excessively high or excessively low speeds.

The present invention provides means for energizing the regulating field winding of a precision regulated motor at a constant rate while operating an alarm whenever the motor operates above a predetermined upper speed limit or below a predetermined lower speed limit. According to the invention a vacuum tube regulator system is provided for controlling the excitation of the regulating field winding of a motor according to the motor speed to maintain the speed of the motor substantially constant. A centrifugal governor is provided for disconnecting the regulator circuits from the regulating field winding, for energizing the regulating field winding at a constant rate, and for operating an alarm in case the motor operates either above a predetermined upper speed limit or below a predetermined lower speed limit.

The present invention is illustrated by means of a regulator system for a motor generator set in a voice frequency carrier telegraph system. The regulator system is disclosed in the patent to E. R. Morton No. 1,788,733, dated January 13, 1931.

In the regulator system employed to disclose the invention a shunt wound motor directly operates an alternating current generator which has a frequency varying according to the motor speed. The frequency of the current developed by the generator is employed for controlling a regulating field winding of the motor to maintain the motor speed substantially constant.

An amplifier tube which has a limited power output has the input circuit thereof connected to the leads of the generator operated by the motor. The output circuit of the amplifier tube is connected to a Wheatstone bridge circuit and to the plate of a phase detector tube. The Wheatstone bridge circuit has two inductance arms, a resistance arm and a resonant arm. The resonant arm of the Wheatstone bridge circuit is tuned to the frequency of the current produced by the generator when the motor is operating at normal speed. The output vertices of the Wheatstone bridge circuit are connected to the input circuit of the phase detector tube. The grid of the phase detector tube is supplied with an alternating voltage which varies in phase relative to the alternating voltage on the plate of the detector tube according to the variation in speed of the motor and the variations in frequency of the generator. The operation of the phase detector tube under the control of a Wheatstone bridge circuit is described in detail in the above-mentioned patent to Morton.

The output circuit of the phase detector tube is coupled to two regulator amplifier tubes by means of a resistance element. The output circuits of the two regulator amplifier tubes are connected to the regulating field winding of the motor. A capacity element is in the output circuit of the phase detector tube to stabilize the regulating operation and prevent hunting action. The condenser effects delayed precision in the operation of the regulator system to reduce the corrected force in magnitude for a time. The operation of the capacity element in preventing hunting action is described in detail in the above-mentioned Morton patent.

In accordance with the present invention a centrifugal governor is provided for operating an alarm in case the motor operates above a predetermined upper limit or below a predetermined lower limit. Means are also provided under the control of the centrifugal governor for disconnecting the regulating field winding of the motor from the regulating circuits and for energizing the regulating field winding at a constant rate in case the motor operates above a predetermined upper speed limit or below a predetermined lower speed limit. Preferably the centrifugal governor is directly operated by the motor. The governor operates a relay whenever the motor goes above the upper speed limit or below the lower speed limit. The relay operates an alarm of any suitable type when energized and at the same time disconnects the regulating field winding of the motor from the regulating circuits and connects the regulating field winding through a fixed resistance element to a constant source of power. Thus an alarm is operated and the field of the motor is energized at a constant rate in case of abnormal motor speed conditions to insure against excessive high or low speed operation by the motor.

The single figure in the accompanying drawing is a diagrammatic view of a control system constructed in accordance with the invention.

Referring to the drawing a motor generator set comprising a direct current motor 1 and an alternating current generator 2 is operated at constant speed to produce an alternating current having a constant frequency. The motor 1 comprises an armature 3, a regulating field winding 4 and a shunt field winding 5. The generator 2 is provided with an armature winding 6, a field winding 7 and a toothed rotor 8. The excitation of the regulating field winding 4 is controlled in accordance with the frequency of the current produced by the generator 2 to maintain the speed of the motor 1 substantially constant with close precision. A centrifugal governor 9 which is directly connected to the motor 1 is provided for disconnecting the precision regulating circuits from the regulating field winding 4, for energizing the field winding 4 at a constant rate and for operating an alarm in case the motor operates above an upper predetermined limit or below a lower predetermined limit.

The armature winding 6 of the generator 2 is connected by a transformer 10 to the input circuit of a vacuum tube amplifier 11 which has limited power output. The output circuit of the amplifier tube 11 is connected to a Wheatstone bridge circuit 12 by means of a transformer 13 having a primary winding 14 and two secondary windings 15 and 16. The two secondary windings 15 and 16 comprise two arms of the Wheatstone bridge circuit 12. A resistance element 17 comprises a third arm of a Wheatstone bridge circuit and a capacity element 18 in parallel with an inductance element 19 comprises a fourth and resonant arm of the Wheatstone bridge circuit. A phase detector tube 20 has the input circuit thereof connected by a transformer 21 to the output vertices of the Wheatstone bridge circuit.

The resonant arm of the Wheatstone bridge circuit 12 is tuned to the frequency of the current developed by the generator 2 when the motor is operating at normal speed. A Wheatstone bridge circuit provided with a resonant arm as above set forth will vary the phase of the voltage at the output vertices with respect to the voltage supplied to the Wheatstone bridge circuit in accordance with the variations in the frequency of the supplied current. The amplifier tube 11 of limited output is not only connected to the Wheatstone bridge circuit 12 but is connected by means of a transformer 22 to the plate of the phase detector tube 20. Thus, the phase relation between the voltage impressed on the grid of the phase detector tube with respect to the voltage impressed upon the plate of the detector tube is varied in accordance with the variations in frequency of the generator 2. Thus, the output from the phase detector tube 20 varies in accordance with the frequency of the generator 2 and in accordance with the speed of the motor 1.

The output circuit of the phase detector tube 20 is coupled by a resistance element 23 to the input circuits of two regulator amplifier tubes 24 and 25. The input circuits and also the output circuits of the tubes 24 and 25 are connected in parallel circuit relation. The output circuits of the regulator tubes 24 and 25 are connected by an armature 26 of a relay 27 to the regulating field winding 4 of the motor 1 in circuit with a source of power 28. The relay 27 is provided with a second armature 29 for controlling an alarm circuit 30.

A battery 31 is provided for supplying filament heating current to the tubes 11, 20, 24 and 25. The grid bias for the amplifier tube 11 is provided by the resistance drop across the filaments in the regulator tubes 24 and 25. A ballast lamp 32 is provided in the filament heating circuit to maintain the filament current substantially constant. The source of power 28 not only supplies current to the field winding 4 and plate potential to the regulator tubes 24 and 25, but also supplies plate potential to the amplifier tube 11. The armature 3 of the motor 1 and the shunt field winding 5 of the motor 1 are supplied with current from the battery 31. The field winding 7 of the generator 2 is connected across the source of power 28. A condenser 34 is connected across the field winding 7 to protect the insulation of the field winding against high induced voltages whenever the field circuit is opened. A filter comprising a condenser 35 and a retardation coil 36 is connected across the source of power 28 to prevent noise currents from the source interfering with the operation of the circuits.

A condenser 37 is connected across the coupling resistance 23 between the phase detector tube 20 and the regulator tubes 24 and 25 to momentarily reduce the inherent precision of the regulator system upon tendency of the motor to change speed. This reduction in the inherent precision of the regulator system continues a sufficient length of time to prevent hunting action. The bridge circuit and the phase detector tube are supplied with power from the same source, namely, the amplifier tube 11 which has a limited power output. Accordingly, when the phase detector tube 20 draws current to charge the condenser 37 across the coupling resistance 23 the voltage condition on the bridge circuit is momentarily changed to delay the corrective force of the regulator circuit for a sufficient time to prevent the regulator from hunting.

In the above described regulator system which is disclosed in the above-mentioned patent to E. R. Morton, a change in speed of the motor 1 produces a change in the frequency of the current produced by the generator 2. The variations in frequency of the generator current vary the phase relation of the voltage supplied by the bridge circuit 12 to the grid of the phase detector tube 20 with respect to the potential supplied to the plate of the phase detector tube by the amplifier tube 11. The output from the phase detector tube 20 varies in accordance with frequency of the generator 2 and the speed of the motor 1. Accordingly the energization of the regulating field winding 4 under control of the regulator tubes 24 and 25 is governed according to the motor speed. The field excitation of the regulating field winding 4 is so controlled as to maintain the motor speed substantially constant. A more complete description of the regulator system is given in the above-mentioned patent to E. R. Morton.

The centrifugal governor 9 is provided with three contact members 39, 40 and 41. The three contact members are aligned with the axis of rotation of the governor, with the contact member 40 positioned between the contact members 39 and 41. The contact member 39 is mounted on a stationary support. The contact member 41 is fixedly mounted on a rotating part of the governor and the contact member 40 is mounted on a spring member 42 in order to be operated in accordance with the speed of the governor. If the motor 1 and the governor 9 operate above a predetermined upper limit, the contact member 40 engages the contact member 41 and if the motor 1 and the governor 9 operate at a speed below the predetermined lower limit, the contact member 40 engages the contact member 39. The contact members 39 and 41 are connected in parallel to one terminal of the battery 31.

In case the motor 1 is operated at abnormal speed and the contact member 40 engages either the contact member 39 or the contact member 41, a circuit is completed from the battery 31 for operating the relay 27 and a relay 44. The relay 27 when operated closes the alarm circuit 30 by means of the armature 29. The alarm operated by the armature 29 of the relay 27 may be of any suitable type. The armature 26 of the relay 27 disconnects the output circuits of the regulator tubes 24 and 25 from the regulating field winding 4 and connects the regulating field winding 4 in series with a resistance element 45 across the source 28. When the field winding 4 is energized from the source 28 in series with the resistance element 45, the motor 1 is operated at approximately constant speed, but not with close precision as when controlled by the precision regulator system. The relay 44 is provided with an armature 47 and serves when operated to complete a holding circuit for the relay 27. The circuit of the relay 44 is opened by a switch 48.

Modifications in the system and in the arrangement of parts may be made within the spirit and scope of the invention and such modifications are intended to be covered by the appended claims.

What is claimed is:

1. In a regulator system, a motor having a regulating field winding, regulator means controlled according to the motor speed for governing said field winding to maintain the motor speed substantially constant, and means operated when the motor speed is above a predetermined upper limit and when the motor speed is below a predetermined lower limit for disconnecting said regulator circuits from the regulating field winding and for energizing the regulating field winding at a constant rate.

2. In a regulator system, a motor having a regulating field winding, regulator means controlled according to the motor speed for governing said field winding to maintain the motor speed substantially constant, and means comprising a relay operated when the motor speed is above a predetermined upper limit and when the motor speed is below a predetermined lower limit for disconnecting said regulator circuits from the regulating field winding and for energizing the regulating field winding at a constant rate and means automatically operated with said relay for locking the relay in operated position.

3. In a regulator system, a motor having a regulating field winding, regulator means controlled according to the motor speed for governing said field winding to maintain the motor speed substantially constant, a centrifugal governor operated by said motor, means comprising a relay operated by said governor when the motor speed is above a predetermined upper limit and when the motor speed is below a predetermined lower limit for energizing the regulating field winding at a constant rate.

4. In a regulator system, a motor having a regulating field winding, control means for governing the excitation of said field winding according to the motor speed to maintain the motor speed substantially constant, and means operated when the motor speed is above a predetermined upper limit and when the motor speed is below a predetermined lower limit for disabling said control means and for energizing the regulating field winding at a constant rate.

5. In a regulator system, a motor having a regulating field winding, regulator means controlled according to the motor speed for governing the excitation of said field winding to maintain the motor speed constant, and means operated when the motor runs at abnormal speed for disconnecting the regulator circuits from the regulating field winding and for energizing the regulating field winding at a constant rate.

6. In a regulator system, a motor having a regulating field winding, vacuum tube regulator means governed according to the motor speed for controlling the excitation of said field winding to maintain the motor speed constant, a centrifugal governor operated according to the motor speed, and means operated by said governor when the motor speed is above a predetermined upper limit and when the motor speed is below a predetermined lower limit for preventing control of the regulating field winding by the regulator circuits and for energizing the regulating field winding at a constant rate.

7. In a regulator system, a motor having a regulating field winding, regulator means controlled according to the motor speed for governing said field winding to maintain the motor speed substantially constant, a centrifugal governor operated according to the motor speed, and means operated by said governor when the motor goes above a predetermined upper speed limit and when the motor speed goes below a predetermined lower speed limit for disconnecting said regulator circuits from the regulating field winding and for energizing the regulating field winding in circuit with a fixed resistance.

DAVID E. TRUCKSESS.